United States Patent
Maxson et al.

(10) Patent No.: US 10,570,329 B2
(45) Date of Patent: Feb. 25, 2020

(54) ENGINEERED BEAD SLURRIES FOR USE IN LIGHTWEIGHT CEMENT SLURRIES AND METHODS RELATING THERETO

(71) Applicant: Halliburton Energy Services, Inc., Houston, TX (US)

(72) Inventors: Joseph K. Maxson, Duncan, OK (US); Chad Brenneis, Marlow, OK (US); Rickey L. Morgan, Duncan, OK (US); Paul Mendenall, Duncan, OK (US); Ronnie G. Morgan, Waurika, OK (US); James R. Benkley, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/890,860

(22) PCT Filed: Sep. 26, 2013

(86) PCT No.: PCT/US2013/061861
§ 371 (c)(1),
(2) Date: Nov. 12, 2015

(87) PCT Pub. No.: WO2015/047268
PCT Pub. Date: Apr. 2, 2015

(65) Prior Publication Data
US 2016/0115366 A1    Apr. 28, 2016

(51) Int. Cl.
*C09K 8/473* (2006.01)
*E21B 21/06* (2006.01)
(Continued)

(52) U.S. Cl.
CPC .............. *C09K 8/473* (2013.01); *C04B 28/02* (2013.01); *C09K 8/467* (2013.01); *E21B 21/062* (2013.01);
(Continued)

(58) Field of Classification Search
CPC .......... C09K 8/473; C04B 28/02; E21B 33/13
(Continued)

(56) References Cited

U.S. PATENT DOCUMENTS

| 6,601,647 B2 | 8/2003 | Brothers et al. |
| 6,631,766 B2 | 10/2003 | Brothers et al. |

(Continued)

FOREIGN PATENT DOCUMENTS

WO    2015047268 A1    4/2015

OTHER PUBLICATIONS

International Search Report and Written Opinion for PCT/US2013/061861 dated Jun. 25, 2014.

*Primary Examiner* — Angela M DiTrani Leff
*Assistant Examiner* — Ashish K Varma
(74) *Attorney, Agent, or Firm* — Thomas Rooney; C. Tumey Law Group PLLC (57) ABSTRACT

Engineering bead slurries may be useful in producing lightweight cement slurries for use in subterranean cementing operations. For example, a method may include engineering a bead slurry to have a shelf-life of about 1 month or greater by performing at least one of (1) calculating the shelf-life for the bead slurry and (2) calculating a minimum yield point required to prevent a lightweight bead of the bead slurry from floating or settling in the bead slurry; wherein the bead slurry comprises a gelled base fluid and a plurality of lightweight beads having a specific gravity of about 0.8 or less; producing the bead slurry; mixing the bead slurry and a cement slurry to yield a lightweight cement slurry; intro- (Continued)

ducing the lightweight cement slurry into a wellbore penetrating a subterranean formation; and allowing the lightweight cement slurry to set therein.

20 Claims, 2 Drawing Sheets (51) Int. Cl.
    *E21B 33/13*     (2006.01)
    *C04B 28/02*     (2006.01)
    *C09K 8/467*     (2006.01)
    *E21B 33/14*     (2006.01)
    *C04B 103/44*     (2006.01)

(52) U.S. Cl.
    CPC .............. *E21B 33/13* (2013.01); *E21B 33/14* (2013.01); *C04B 2103/445* (2013.01)

(58) Field of Classification Search
    USPC ........................................................ 166/292
    See application file for complete search history.

(56) References Cited

U.S. PATENT DOCUMENTS

| | | | |
|---|---|---|---|
| 6,648,961 B2 | 11/2003 | Brothers et al. | |
| 6,660,078 B2 | 12/2003 | Brothers et al. | |
| 6,832,652 B1* | 12/2004 | Dillenbeck | C04B 28/02 |
| | | | 166/293 |
| 7,201,228 B2 | 4/2007 | Robb et al. | |
| 7,390,356 B2 | 6/2008 | Kulakofsky et al. | |
| 7,398,827 B2* | 7/2008 | Kulakofsky | C04B 28/06 |
| | | | 166/293 |
| 8,653,011 B2* | 2/2014 | Samuel | C09K 8/34 |
| | | | 166/305.1 |
| 2005/0011412 A1 | 1/2005 | Vijn et al. | |
| 2005/0241545 A1* | 11/2005 | Vargo, Jr. | C04B 40/0039 |
| | | | 106/823 |
| 2006/0289162 A1 | 12/2006 | Santra et al. | |

* cited by examiner

ENGINEERED BEAD SLURRIES FOR USE IN LIGHTWEIGHT CEMENT SLURRIES AND METHODS RELATING THERETO

BACKGROUND

The exemplary embodiments described herein relate to engineering bead slurries for use in producing lightweight cement slurries for use in conjunction with subterranean cementing operations.

Hydraulic cement compositions are commonly used in oil, gas and water well completion and remedial operations. For example, hydraulic cement compositions are used in primary cementing operations whereby strings of pipe such as casing and liners are cemented in well bores. In performing primary cementing, a hydraulic cement composition is pumped into the annular space between the walls of a well bore and the exterior of a string of pipe disposed therein. The cement composition is permitted to set in the annular space thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented.

In some locations, the subterranean zones or formations into or through which wellbores are drilled have high permeabilities and low compressive and tensile strengths. As a result, the resistance of the zones or formations to shear are low and they have low fracture gradients. When a hydraulic cement composition is introduced into a well bore penetrating such a subterranean zone or formation, the hydrostatic pressure exerted on the walls of the well bore can exceed the fracture gradient of the zone or formation and cause fractures to be formed in the zone or formation into which the cement composition is lost. In some instances, lightweight cement compositions (e.g., foamed cements or cements with low density additives such as hollow glass beads) are used to overcome this issue.

However, the preparation of lightweight cement compositions is often difficult, in the case of glass beads, they are buoyant and lightweight and tend to rise out of the slurry. Moreover, their lightweight nature allows the beads to be easily blown around by movement of the air, which changes the final cement slurry composition. Accordingly, in many instances especially at off-shore well-sites, cements with low density additives are used sparingly if at all. Rather, foamed cements, which are several times more expensive than the low-density additive cements, are used. Further, the equipment and materials needed to produce foamed cements occupy a significant amount of space, which is already limited at offshore well sites.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The exemplary embodiments described herein relate to engineering bead slurries for use in producing lightweight cement slurries for use in conjunction with subterranean cementing operations.

The bead slurries described herein comprise a plurality of lightweight beads and a gelled base fluid. In such a slurry, the lightweight beads can be used to prepare cement slurries while mitigating the drawbacks associated with dry lightweight beads (e.g., poor mixing and being blown around). Further, the bead slurries described herein may be engineered to have a long shelf life, which in turn allows for storage of the bead slurries and transportation as bead slurries. Advantageously for an offshore well site, for example, the lightweight beads can be transported to as a slurry and, then, stored or pumped from the transportation vehicle directly to mixing of the bead slurry with the cement slurry to produce the lightweight cement slurry. Mixing with bead slurry pumped from transportation vehicles reduces the one-site footprint associated with these compositions and methods.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

Some embodiments described herein may involve engineering a bead slurry and implementing the bead slurry in a lightweight cement slurry. Generally, a bead slurry described herein may comprise a plurality of lightweight beads and a gelled base fluid.

As used herein, the term "lightweight beads" refers to rigid, substantially spherical particles having a specific gravity less than 1. As used herein, the term "substantially spherical" refers to a generally spherical shape that may include defects like indentations, protrusions, holes, and the like. Examples of lightweight beads may include, but are not limited to, cenospheres, hollow glass spheres, hollow ceramic spheres, and the like. Cenospheres are hollow spheres primarily comprising silica ($SiO_2$) and alumina ($Al_2O_3$). An example of a commercially available hollow glass bead is the Glass Bubbles HGS Series available from 3M™ (e.g., HGS6000).

In some embodiments, the lightweight beads may have an average diameter ranging from a lower limit of about 1 micron, 5 microns, or 10 microns to an upper limit of about 100 microns, 80 microns, 50 microns, 40 microns, or 20 microns, and wherein the average diameter of the lightweight beads may range from any lower limit to any upper limit and encompasses any subset therebetween. As used herein, the term "average diameter" refers to the volume-based mean diameter.

In some embodiments, the lightweight beads may have a specific gravity of about 0.85 or less (e.g., about 0.1 to about 0.85).

In some embodiments, the lightweight beads may present in the bead slurry in an amount ranging from a lower limit of about 45%, 50%, 55%, or 57% by volume of the bead slurry to an upper limit of about 60%, 58%, 57%, or 55% by volume of the bead slurry, and wherein amount of the lightweight beads may range from any lower limit to any upper limit and encompasses any subset therebetween. As used herein, the term "average diameter" refers to the volume-based mean diameter.

In some embodiments, a gelled base fluid suitable for use in conjunction with a bead slurry described herein may comprise water and a gelling agent. In some embodiments, gelling agents may be included in the gelled base fluids in an amount suitable to achieve a viscosity ranging from a lower limit of about 5 cP, 10 cP, 100 cP, 200 cP, or 300 cP to an upper limit of about 1000 cP, 800 cP, 600 cP, 500 cP, 400 cP, or 300 cP, and wherein the viscosity of the gelled base fluid may range from any lower limit to any upper limit and encompasses any subset therebetween. In some embodiments, gelling agents may be included in the gelled base fluids in an amount ranging from a lower limit of about 0.01%, 0.05%, 0.1%, 0.5%, or 1% by volume of the bead slurry to an upper limit of about 5%, 2.5%, 1%, or 0.5% by volume of the bead slurry, and wherein the amount of gelling agent may range from any lower limit to any upper limit and encompasses any subset therebetween.

By way of nonlimiting example, a bead slurry may comprise a plurality of lightweight beads (e.g., hollow glass spheres) at about 50% to about 60% by volume of the bead slurry, water, and a gelling agent at about 0.01% to about 5% by volume of the bead slurry. By way of another nonlimiting example, a bead slurry may comprise a plurality of lightweight beads (e.g., hollow glass spheres) at about 50% to about 60% by volume of the bead slurry and a gelled base fluid that comprises water and a gelling agent, wherein the gelled base fluid has a viscosity of about 5 cP to about 1000 cP.

Examples of gelling agents may include, but are not limited to, polymers, crosslinked polymers, clays, viscoelastic surfactants, shear thinning gels, and the like, and combinations thereof.

Examples of polymeric gelling agents may include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and combinations thereof. Examples of polymeric gelling agents may also include, but are not limited to, synthetic polymers like 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, acrylamide/2-(methacryloyloxy)ethyltrimethylammonium methyl sulfate copolymer, acrylamide/2-(methacryloyloxy)ethyltrimethylammonium chloride copolymer, a derivatized cellulose that comprises cellulose grafted with an allyl or a vinyl monomer, and the like, and derivatives thereof, and combinations thereof. In some instances, combinations of the foregoing polymeric gelling agents may be used.

Examples of crosslinked polymeric gelling agents may include, but are not limited to, any of the fore mentioned polymeric gelling agents or combinations of polymeric gelling agents with crosslinking agents like a borate ion, a metal ion, or a combination thereof. Examples of suitable crosslinking agents include, but are not limited to, borate ions, magnesium ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions. Examples of such compounds include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof.

Examples of clay gelling agents may include, but are not limited to, attapulgite, sepiolite, vermiculite, illite, muscovite, biotite, Fuller's earth, kaolinite, cookeite, bulk clay, halloysite, flint clay, montmorillonite, bentonite, hectorite, and the like, and any combination thereof. In some instance, clay gelling agents may further comprise soda ash or the like.

Examples of viscoelastic surfactant gelling agents may include, but are not limited to, methyl ester sulfonates ("MES"), sarcosinates, alkyl sarcosinates, taurates (e.g., N-acyl N-methyl taurates, such as N-cetyl N-methyl taurate, N-erucyl N-methyl taurate, N-oleoyl N-methyl taurate, N-cocoyl N-methyl taurate, N-tallowyl N-methyl taurate, N-tallyl N-methyl taurate, N-soyayl N-methyl taurate and N-rapeseedyl N-methyl taurate or N-acyl taurates, such as N-erucyl taurate, N-oleoyl taurate, N-cocoyl taurate, N-tallowyl taurate, N-tallyl taurate, N-soyayl taurate, and N-rapeseedyl taurate), behenyl quats (e.g., behenyl trimethyl ammonium chloride), and the like, any derivative thereof, and any combination thereof.

In some instances, a shear thinning gel may be easily disrupted or thinned, under stress, such as caused by moving the fluid, but which quickly returns to a gel or gel-like state when the movement or other stress is alleviated or removed.

Engineering a bead slurry may involve, in some embodiments, calculating a shelf-life for the bead slurry. As used herein, the term "shelf-life" refers the time it takes for a lightweight bead at a given concentration in a gelled base fluid to move 1 inch.

To calculate the shelf-life, first the velocity of the lightweight bead in a bead slurry with given properties (e.g., size of the lightweight beads, the specific gravity of the lightweight beads, the concentration of the lightweight beads, the density gelled base fluid, and the like). Calculating the velocity of the lightweight bead including effects of particle-to-particle interactions ($\vartheta_{ptp}$) may be achieved with Formulas 1-4, assuming a Herschel-Bulkley fluid.

$$\vartheta_t = \left[4g\frac{D_p(\rho_p - \rho_f)}{3\rho_f C_D}\right] \qquad \text{Formula 1}$$

$$C_D = \frac{24}{Re_p} \qquad \text{Formula 2}$$

$$Re_p = \frac{\rho_f D_p \vartheta_t}{\frac{\tau_o}{\left(\frac{2\vartheta_t}{D_p}\right)} + K_{hb}\left(\frac{2\vartheta_t}{D_p}\right)^{(n_{hb}-1)}} \qquad \text{Formula 3}$$

$$\vartheta_{ptp} = \vartheta_t(1 - C_p)^{4.2} \qquad \text{Formula 4}$$

where $C_p$ is the volume concentration of the lightweight bead; $D_p$ is the diameter of the lightweight bead; g is the acceleration of gravity; $K_{hb}$ is the consistency coefficient of a Herschel-Bulkley fluid; $n_{hb}$ is the shear thinning index of a Herschel-Bulkley fluid; $Re_p$ is the effective Reynolds number for the lightweight bead; $\vartheta_t$ is the terminal velocity of the lightweight bead; $\vartheta_{ptp}$ is the velocity of the lightweight bead including effects of particle-to-particle interactions; $\rho_f$ is the density of the gelled fluid; $\rho_p$ is the density of the lightweight bead; and $\tau_o$ is the yield stress of a Herschel-Bulkley fluid.

Using the velocity $\vartheta_{ptp}$, the shelf-life can be calculated (i.e., the time for a lightweight bead to move 1 inch). In some embodiments, the bead slurry may be engineered to have a storage time ranging from a lower limit of about 1 day, 1 week, 1 month, 2 months, 3 months, or 6 months to an upper limit of about 72 months, 36 months, 24 months, 12 months, 9 months, 6 months, 3 months, or 1 month, and wherein the storage time of the bead slurry may range from any lower limit to any upper limit and encompasses any subset therebetween.

Engineering a bead slurry may involve, in some embodiments, calculating a minimum yield point required to prevent the lightweight beads from floating or settling in the bead slurry may be calculated using Formula 5.

$$\tau_m = \frac{\{30\rho_p(D_p)g\}}{\sum\left(1 - \frac{i}{90}\right)\sin(90 - i)} \qquad \text{Formula 5}$$

where $\tau_m$ is the minimum yield point to prevent the lightweight beads from floating or settling in the bead slurry; $\rho_p$ is the density of the lightweight bead; $D_p$ is the diameter of the lightweight bead; and i is 1 to 90 as numerical approximation.

Some embodiments may involve engineering a bead slurry, preparing the bead slurry, and preparing a lightweight cement slurry that comprises the bead slurry and a cement slurry. Examples of cement slurries may include, but are not limited to, those that comprise water and at least one of a Portland cement, a pozzolan cement, a gypsum cement, a high alumina content cement, a slag cement, a silica cement, and any combination thereof. Examples of Portland cements may include, but are not limited to, Portland cements classified as Classes A, C, H, and G cements according to American Petroleum Institute, including combinations thereof. Examples of pozzolan cements may include, but are not limited to, fly ash, silica fume, granulated blast furnace slag, calcined shale, opaline shale, pumice, pumicite, diatomaceous earth, volcanic ash, tuff, and any combination thereof. In some instances, the cement slurry may further comprise basic materials, which may include, but are not limited to, sodium hydroxide, sodium bicarbonate, sodium carbonate, lime, and combinations thereof. In some embodiments, the cement slurry may further comprise additives, which may include, but are not limited to, set retarders, set accelerators, and the like.

In some embodiments, the bead slurry may be prepared and stored before preparing the lightweight cement slurry. In some embodiments, the storage time for the bead slurry may range from a lower limit of about 1 day, 1 week, 1 month, 2 months, 3 months, or 6 months to an upper limit of about 1 year, 9 months, 6 months, 3 months, or 1 month, and wherein the storage time of the bead slurry may range from any lower limit to any upper limit and encompasses any subset therebetween. One of ordinary skill in the art, with the benefit of this disclosure, should recognize that the storage time may be outside the preferred ranges described herein based on the shelf-life of the bead slurry (e.g., 72 months or longer).

In some embodiments, the bead slurry may be homogenized periodically during storage (e.g., about every 1 to 3 day, about once or twice a week, or about 1 to about 3 times per month).

In some embodiments, the bead slurry may be prepared at a first location and transported to a second location for use (e.g., at a well-site). In some embodiments, the bead slurry may be transferred from a transportation vehicle during preparation of the lightweight cement slurry.

In some embodiments, the amount of bead slurry in the lightweight cement slurry may range from a lower limit of about 30%, 40%, 50%, or 60% by weight of the cement slurry to about 100%, 90%, 80%, 70%, or 60% by weight of the cement slurry, and wherein the amount of bead slurry in the lightweight cement slurry may range from any lower limit to any upper limit and encompasses any subset therebetween.

In some embodiments, mixing of the bead slurry and the cement slurry to yield the lightweight cement slurry may be done on-the-fly.

Some embodiments may involve introducing a lightweight cement slurry described herein into a wellbore penetrating a subterranean formation. In some embodiments, the cement slurry may be placed in a desired location within the wellbore, the subterranean formation, or both and allowed to set therein. Examples of cementing operations suitable for implementing a cement slurry described herein may include, but are not limited to, primary cementing operations, secondary cementing operations, remedial cementing operations, plugging operations, and the like.

In various embodiments, systems configured for preparing, transporting, and delivering the lightweight cement slurries described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey a lightweight cement slurry comprising a bead slurry and a cement slurry. The pump may be, for example, a high pressure pump or a low pressure pump, which may depend on, inter alia, the viscosity and density of the lightweight cement slurry, the type of the cementing operation, and the like.

In some embodiments, the systems described herein may further comprise a mixing tank arranged upstream of the pump and in which the lightweight cement slurry is formulated. In various embodiments, the pump (e.g., a low pressure pump, a high pressure pump, or a combination thereof) may convey the lightweight cement slurry from the mixing tank or other source of the lightweight cement slurry to the tubular. In other embodiments, however, the lightweight cement slurry can be formulated offsite and transported to a worksite, in which case the lightweight cement slurry may be introduced to the tubular via the pump directly from a transport vehicle, a shipping container (e.g., a truck, a railcar, a barge, or the like), or a maritime vessel or from a transport pipeline. In yet other embodiments, the cementing fluid may be formulated on the fly at the well site where components of the cementing fluid are pumped from a transport (e.g., a vehicle or pipeline) and mixed during introduction into the tubular. In any case, the lightweight cement slurry may be drawn into the pump, elevated to an appropriate pressure, and then introduced into the tubular for delivery downhole.

Figure 1:
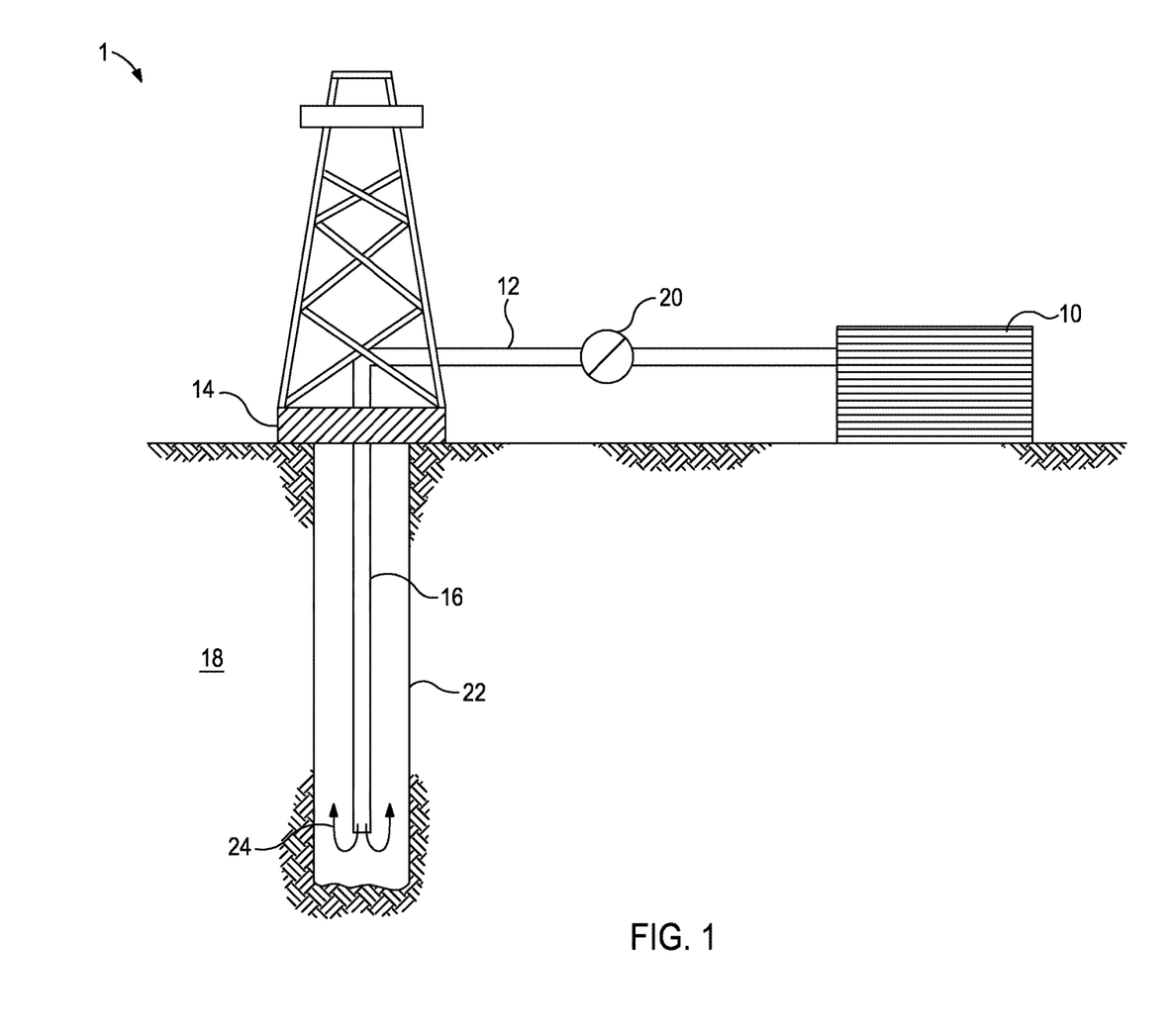
FIG. 1 illustrates a system suitable for use in cementing operations with the lightweight cement slurries described herein.

FIG. 1 shows an illustrative schematic of a system that can deliver lightweight cement slurries of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a lightweight cement slurry of the present invention may be formulated. Again, in some embodiments, the mixing tank 10 may represent or otherwise be replaced with a transport vehicle or shipping container configured to deliver or otherwise convey the cementing fluid to the well site. The lightweight cement slurry may be conveyed via line 12 to wellhead 14, where the lightweight cement slurry enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the lightweight cement slurry may subsequently return up the wellbore in the annulus between the tubular 16 and the wellbore 22 as indicated by flow lines 24. In other embodiments, the cementing fluid may be reverse pumped down through the annulus and up tubular 16 back to the surface, without departing from the scope of the disclosure. Pump 20 may be configured to raise the pressure of the lightweight cement slurry to a desired degree before its introduction into tubular 16 (or annulus). It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other cementing operations (e.g., squeeze operations, reverse cementing (where the cement is introduced into an annulus between a tubular and the wellbore and returns to the wellhead through the tubular), and the like).

It is also to be recognized that the disclosed lightweight cement slurries may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. a method that includes engineering a bead slurry to have a shelf-life of about 1 month or greater by performing at least one of (1) calculating the shelf-life for the bead slurry and (2) calculating a minimum yield point required to prevent a lightweight bead of the bead slurry from floating or settling in the bead slurry; wherein the bead slurry comprises a gelled base fluid and a plurality of lightweight beads having a specific gravity of about 0.8 or less; producing the bead slurry; mixing the bead slurry and a cement slurry to yield a lightweight cement slurry; introducing the lightweight cement slurry into a wellbore penetrating a subterranean formation; and allowing the lightweight cement slurry to set within a portion of the wellbore, a portion of the subterranean formation, or both;

B. a method that includes engineering a bead slurry to have a shelf-life of about 1 month or greater by performing at least one of (1) calculating the shelf-life for the bead slurry and (2) calculating a minimum yield point required to prevent a lightweight bead of the bead slurry from floating or settling in the bead slurry; wherein the bead slurry comprises a gelled base fluid having a viscosity of about 10 cP to about 1000 cP and a plurality of lightweight beads having a specific gravity of about 0.8 or less; producing the bead slurry; storing the bead slurry for about 1 month or greater; transporting the bead slurry to a well-site; mixing at the well-site the bead slurry and a cement slurry to yield a lightweight cement slurry; introducing the lightweight cement slurry into a wellbore penetrating a subterranean formation; and allowing the lightweight cement slurry to set within a portion of the wellbore, a portion of the subterranean formation, or both; and C. a method that includes engineering a bead slurry to have a shelf-life of about 2 months or greater by performing at least one of (1) calculating a shelf-life for the bead slurry and (2) calculating a minimum yield point required to prevent a lightweight bead of the bead slurry from floating or settling in the bead slurry; wherein the bead slurry comprises a gelled base fluid having a viscosity of about 10 cP to about 200 cP and a plurality of hollow glass beads having an average diameter of about 1 micron to about 20 microns; producing the bead slurry; mixing the bead slurry and a cement slurry to yield a lightweight cement slurry; introducing the lightweight cement slurry into a wellbore penetrating a subterranean formation; and allowing the lightweight cement slurry to set within a portion of the wellbore, a portion of the subterranean formation, or both.

Each of embodiments A, B, and C may have one or more of the following additional elements in any combination: Element 1: wherein the gelled base fluid comprises water and a gelling agent, and wherein the bead slurry comprises water, the plurality of lightweight beads at about 50% to about 60% by volume of the bead slurry, and the gelling agent at about 0.01% to about 5% by volume of the bead slurry; Element 2: wherein the lightweight beads comprise hollow glass beads; Element 3: wherein the gelled base fluid comprises water and a gelling agent, and wherein the gelling agent comprises a polymer; Element 4: wherein the gelled base fluid comprises water and a gelling agent, and wherein the gelling agent comprises a clay; Element 5: wherein the gelled base fluid comprises water and a gelling agent, and wherein the gelling agent comprises a viscoelastic surfactant; Element 6: wherein the gelled base fluid a viscosity of about 5 cP to about 1000 cP; Element 7: the method further comprising storing the bead slurry for about 1 month or greater, homogenizing the bead slurry about 1 to 3 days during storing of the bead slurry, and wherein the bead slurry has a viscosity of about 10 cP to about 1,000 cP after 1 month of storing; Element 8: wherein the bead slurry has a shelf-life of about 3 months or greater; Element 9: wherein the bead slurry has a shelf-life of about 6 months or greater; Element 10: wherein the plurality of lightweight beads comprise a plurality of hollow glass beads having an average diameter of about 1 micron to about 100 microns; Element 11: wherein the plurality of lightweight beads are at about 55% to about 60% by volume of the bead slurry; Element 12: wherein the average diameter of the lightweight beads is about 1 micron to about 20 microns, and wherein the bead slurry has a shelf-life of about 3 months or greater; Element 13: wherein the average diameter of the lightweight beads is about 1 micron to about 20 microns, wherein the plurality of lightweight beads are at about 55% to about 60% by volume of the bead slurry, wherein the gelled base fluid has a viscosity of about 10 cP to about 400 cP, and wherein the bead slurry has a shelf-life of about 4 months or greater; and Element 14: the method further comprising transferring the bead slurry from a transportation vehicle during mixing the bead slurry and the cement slurry.

By way of non-limiting example, exemplary combinations applicable to Embodiments A, B, and C include: Element 1 in combination with one of Elements 3-5; Element 1 in combination with Element 2; Element 1 in combination with Element 6; Element 1 in combination with Element 2, Element 6, and optionally one of Elements 3-5; any of the foregoing in combination with Element 8 or 9; any of the foregoing in combination with Element 7; Element 7 in combination with one of Elements 8 or 9; Element 10 in combination with any of the foregoing; Element 10 in combination with one of Elements 3-5; Element 10 in combination with Element 1; Element 10 in combination with Element 2; Element 11 in combination with any of the foregoing; Element 11 in combination with one of Elements 3-5; Element 11 in combination with Element 1; Element 11 in combination with Element 2; Element 12 in combination with any of the foregoing; Element 12 in combination with one of Elements 3-5; Element 12 in combination with Element 1; Element 12 in combination with Element 2; at least two of Elements 10-12 in combination; Element 13 in combination with one of Elements 3-5; Element 13 in combination with Element 1; Element 13 in combination with Element 2; any of the foregoing in combination with Element 14; and one of Elements 1-13 in combination with Element 14.

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

To facilitate a better understanding of the present invention, the following examples of preferred or representative embodiments are given. In no way should the following examples be read to limit, or to define, the scope of the invention.

EXAMPLES

Example 1

Formulas 1-4 above were used to calculate the shelf-life for a plurality of bead slurries with varying gelled base fluid viscosity and lightweight bead average diameter, Table 1. In this example, the lightweight beads were hollow glass spheres having a specific gravity of about 0.46; the gelled base fluid was assigned a specific gravity of about 1.0; and the volume concentration of hollow glass beads in the bead slurry was about 50%.

TABLE 1

Shelf-Life (days) of the Bead Slurry with 50 v % Hollow Glass Beads

| Particle Diameter (microns) | Viscosity of the Gelled Base Fluid | | | | | | |
|---|---|---|---|---|---|---|---|
| | 10 cP | 100 cP | 200 cP | 300 cP | 400 cP | 500 cP | 1000 cP |
| 5 | 24 | 241 | 482 | 723 | 964 | 1205 | 2410 |
| 10 | 6.0 | 60 | 121 | 181 | 241 | 301 | 603 |
| 20 | 1.5 | 15 | 30 | 45 | 60 | 75 | 151 |
| 40 | 0.4 | 3.8 | 8 | 11 | 15 | 19 | 38 |

Example 2

Formulas 1-4 above were used to calculate the shelf-life for a plurality of bead slurries with varying gelled base fluid viscosity and lightweight bead average diameter, Table 2. In this example, the lightweight beads were hollow glass spheres having a specific gravity of about 0.46; the gelled base fluid was assigned a specific gravity of about 1.0; and the volume concentration of hollow glass beads in the bead slurry was about 58%.

TABLE 2

Shelf-Life (days) of the Bead Slurry with 58 v % Hollow Glass Beads

| Particle Diameter (microns) | Viscosity of the Gelled Base Fluid | | | | | | |
|---|---|---|---|---|---|---|---|
| | 10 cP | 100 cP | 200 cP | 300 cP | 400 cP | 500 cP | 1000 cP |
| 5 | 50 | 501 | 1003 | 1504 | 2005 | 2506 | 5013 |
| 10 | 12.5 | 125 | 251 | 376 | 501 | 627 | 1253 |
| 20 | 3.1 | 31 | 63 | 94 | 125 | 157 | 313 |
| 40 | 0.8 | 7.8 | 16 | 23 | 31 | 39 | 78 |

Examples 1 and 2 illustrate that bead slurries can be engineered to have a desired shelf-life, which depends on, inter alia, the lightweight bead diameter, the viscosity of the gelled base fluid, and the concentration of the lightweight beads. Further, the shelf-life of a bead slurry can be engineered to be greater than 6 months, and in some instances, longer than 72 months.

Example 3

Three bead slurries were prepared according to Table 3. The rheological properties of the three bead slurries were analyzed over several days, Tables 4-6, using a Fann 35 Rheometer with FYSA attachment. Before taking the rheology measurements, the bead slurries were homogenized by stirring with a paddle.

TABLE 3

| Component | Percent By Volume of the Bead Slurry | | |
|---|---|---|---|
| | Slurry 1 | Slurry 2 | Slurry 3 |
| water | 41.5 | 41.6 | 42.7 |
| hollow glass beads (HGS6000 from 3M ™) | 58 | 58.1 | 56.7 |
| soda ash | 0.1 | 0.1 | 0.1 |
| bentonite | 0.4 | 0.2 | 0.5 |

TABLE 4

Rheological Data for Slurry 1

| | Gelled Base Fluid | Initial | 1 Day | 2 Days | 5 Days | 12 Days | 28 Days |
|---|---|---|---|---|---|---|---|
| 3 RPM | 0 | 10 | 3 | 3 | 5 | 3 | 8 |
| 6 RPM | 0 | 11 | 6 | 4 | 6.5 | 5 | 10 |
| 30 RPM | 0 | 15 | 13 | 12 | 15 | 14 | 25 |
| 60 RPM | 0.5 | 21 | 23 | 20 | 26 | 25 | 38 |
| 100 RPM | 1.5 | 31 | 37 | 32 | 37 | 40 | 70 |
| 200 RPM | 4 | 48 | 66 | 56 | 65 | 64 | 102 |
| 300 RPM | 8 | 50 | 92 | 83 | 98 | 100 | 130 |
| 3D (30 sec) | 0 | 14 | 5 | 4 | 7 | 5 | 14 |
| 6D (30 sec) | 0 | 14 | 6 | 6 | 10 | 7 | 21 |
| % Free Fluid | n/a | none | none | none | none | none | none |

TABLE 5

Rheological Data for Slurry 2

| | Gelled Base Fluid | Initial | 1 Day | 4 Days | 11 Days | 28 Days | 60 Days |
|---|---|---|---|---|---|---|---|
| 3 RPM | 0 | 3 | 1.5 | 3 | 3 | 3.5 | 6 |
| 6 RPM | 0 | 4 | 3 | 3.5 | 4 | 5 | 7.5 |
| 30 RPM | 0 | 7 | 8 | 10 | 11 | 14 | 18 |
| 60 RPM | 0.5 | 11 | 14 | 17 | 18 | 24 | 30 |
| 100 RPM | 1 | 17 | 23 | 26 | 28 | 36 | 41 |
| 200 RPM | 3 | 28 | 42 | 47 | 53 | 37 | 69 |
| 300 RPM | 5 | 38 | 64 | 72 | 84 | 105 | 100 |
| 3D (30 sec) | 0 | 4 | 5 | 4.5 | 6 | 6 | 6 |
| 6D (30 sec) | 0 | 5 | 4 | 6 | 6 | 6 | 10 |
| % Free Fluid | n/a | none | 1% | 0.5% | trace | none | none |

TABLE 6

Rheological Data for Slurry 3

| | Gelled Base Fluid | Initial | 3 Days | 10 Days | 28 Days | 60 Days |
|---|---|---|---|---|---|---|
| 3 RPM | 0 | 4 | 3 | 3 | 3 | 4.5 |
| 6 RPM | 0 | 6 | 4 | 5 | 4 | 6 |
| 30 RPM | 0 | 8.5 | 11 | 12 | 12 | 15 |
| 60 RPM | 0.5 | 13 | 18 | 20 | 20 | 25 |
| 100 RPM | 1.5 | 18 | 27 | 33 | 32 | 35 |
| 200 RPM | 4 | 28 | 51 | 55 | 57 | 63 |
| 300 RPM | 8 | 38 | 75 | 75 | 84 | 90 |
| 3D (30 sec) | 0 | 12 | 5 | 6 | 5 | 6 |
| 6D (30 sec) | 0 | 14 | 8 | 9 | 7 | 12 |
| % Free Fluid | n/a | none | none | none | none | none |

These examples illustrate that the viscosity of the bead slurries increase over time (e.g., when reviewing the 300 RPM data) but do not exceed a reasonable threshold for pumpability (e.g., 75 at 300 RPM).

Example 4

Using Formula 5 above, minimum yield point required to prevent the lightweight beads from floating or settling was calculated for two types of lightweight beads (a specific gravity of 0.46 and a specific gravity of 0.80) at a plurality of average diameters. The results are presented in FIG. 2.

Figure 2:
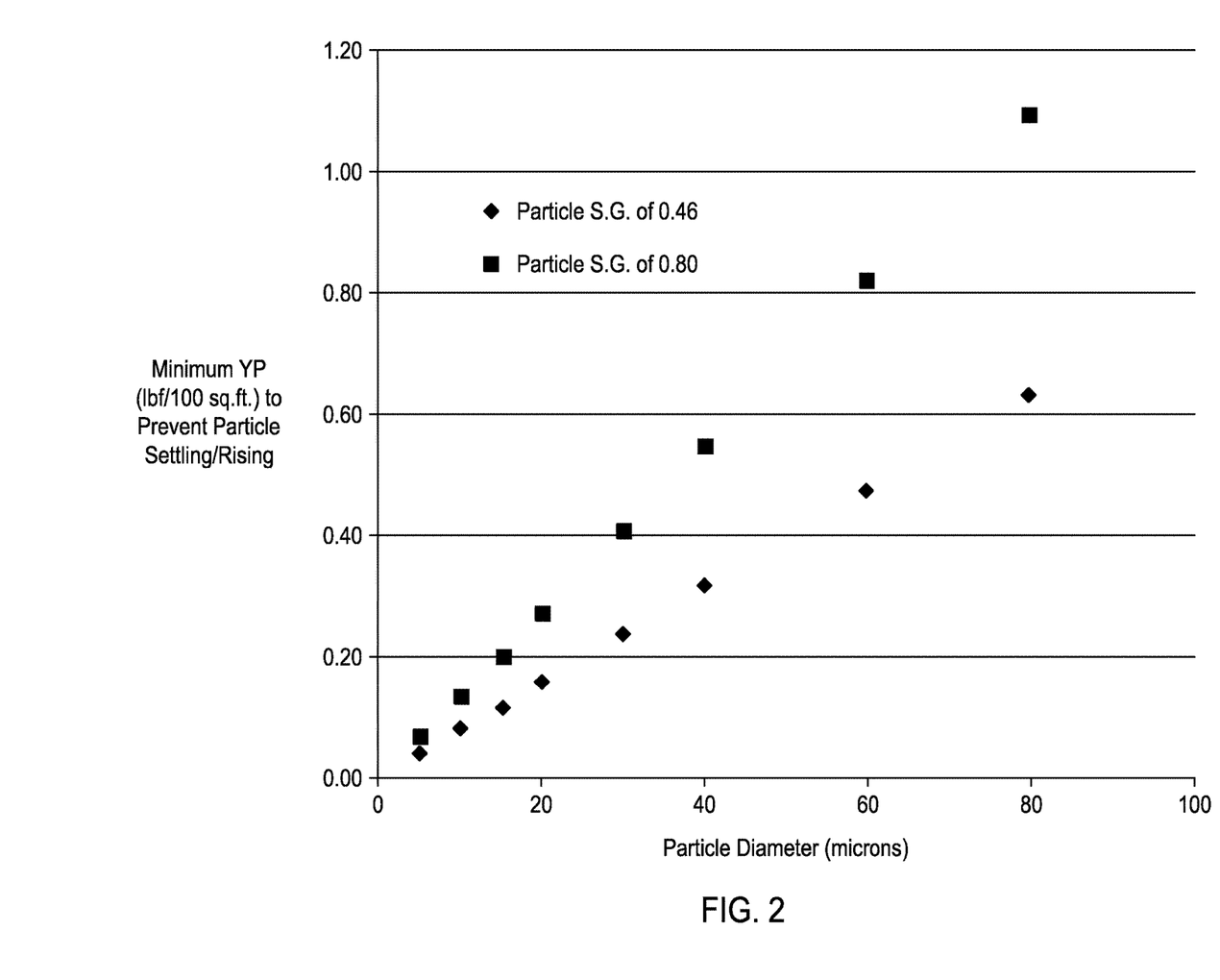
FIG. 2 provides a graph of the minimum yield point required to prevent the lightweight beads from floating or settling as a function of particle diameter for various specific gravity particles.

The minimum yield point for both sets of lightweight beads increase with increasing average diameter. The 0.46 specific gravity lightweight beads generally require a lower minimum yield point than the 0.80 specific gravity lightweight beads for the same average diameter.

This example illustrates that the bead slurries can be engineered to prevent floating or settling with yield point of the slurry and the specific gravity and the average diameter of the lightweight beads.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   calculating a shelf-life for a bead slurry, wherein the shelf-life is about 1 month or greater;
   mixing a gelled base fluid and a plurality of lightweight beads at 300 rotations per minute to produce the bead slurry, wherein the bead slurry has an initial viscosity, wherein the plurality of lightweight beads has a specific gravity of about 0.8 or less, wherein the gelled base fluid comprises water and a gelling agent of about 0.01% to about 5% by volume of the bead slurry;
   storing the bead slurry for about 1 month or longer, wherein the viscosity of the bead slurry is at least twice the initial viscosity for 1 to 2 months;
   mixing the bead slurry and a cement slurry to yield a lightweight cement slurry;
   introducing the lightweight cement slurry into a wellbore penetrating a subterranean formation; and
   allowing the lightweight cement slurry to set within a portion of the wellbore, a portion of the subterranean formation, or both;
   wherein calculating the shelf-life comprises calculating a velocity of the lightweight beads in the bead slurry.

2. The method of claim 1, further comprising calculating a minimum yield point to prevent the lightweight beads from floating or settling in the bead slurry, wherein the minimum yield point is based on a diameter of the lightweight beads and a density of the lightweight beads.

3. The method of claim 2, wherein the gelling agent comprises a polymer.

4. The method of claim 2, wherein the gelling agent comprises a clay.

5. The method of claim 2, wherein the gelling agent comprises a viscoelastic surfactant.

6. The method of claim 1, wherein the lightweight beads comprise hollow glass beads.

7. The method of claim 1, wherein the gelled base fluid a viscosity of about 5 cP to about 1000 cP.

8. The method of claim 1 further comprising:
   homogenizing the bead slurry about 1 to 3 days during storing of the bead slurry; and
   wherein the bead slurry has a viscosity of about 10 cP to about 1,000 cP after 1 month of storing.

9. The method of claim 1, the bead slurry has a shelf-life of about 3 months or greater.

10. The method of claim 1, the bead slurry has a shelf-life of about 6 months or greater.

11. The method of claim 1, wherein the plurality of lightweight beads comprise a plurality of hollow glass beads having an average diameter of about 1 micron to about 100 microns.

12. The method of claim 1, wherein the plurality of lightweight beads are at about 55% to about 60% by volume of the bead slurry.

13. The method of claim 1, wherein the average diameter of the lightweight beads is about 1 micron to about 20 microns, and wherein the bead slurry has a shelf-life of about 3 months or greater.

14. The method of claim 1, wherein the average diameter of the lightweight beads is about 1 micron to about 20 microns, wherein the plurality of lightweight beads are at about 55% to about 60% by volume of the bead slurry, wherein the gelled base fluid has a viscosity of about 10 cP to about 400 cP, and wherein the bead slurry has a shelf-life of about 4 months or greater.

15. The method of claim 1, wherein calculating the shelf-life further comprises calculating a terminal velocity of the lightweight beads in the bead slurry.

16. A system for performing the introducing step of claim 1, wherein the system comprises a pump fluidly coupled to a tubular extending into the wellbore penetrating the subterranean formation.

17. A method comprising:
   calculating a shelf-life for a bead slurry, wherein the shelf-life is about 1 month or longer;
   mixing a gelled base fluid and a plurality of lightweight beads at 300 rotations per minute to produce the bead slurry, wherein the bead slurry has an initial viscosity, wherein the gelled base fluid has a viscosity of about 10 cP to about 1000 cP, wherein the plurality of lightweight beads has a specific gravity of about 0.8 or less, wherein the gelled base fluid comprises water and a gelling agent of about 0.1% to about 5% by volume of the bead slurry, and wherein the shelf-life is the time it takes for the lightweight bead in the gelled fluid to move 1 inch;
   storing the bead slurry for about 1 month or longer, wherein the viscosity of the head slurry is at least twice the initial viscosity for 1 to 2 months;
   transporting the bead slurry to a well-site;
   mixing at the well-site the bead slurry and a cement slurry to yield a lightweight cement slurry;

introducing the lightweight cement slurry into a wellbore penetrating a subterranean formation; and allowing the lightweight cement slurry to set within a portion of the wellbore, a portion of the subterranean formation, or both;

wherein calculating the shelf-life comprises calculating a velocity of the lightweight beads in the bead slurry.

18. The method of claim 17, wherein calculating the shelf-life further comprises calculating a terminal velocity of the lightweight beads in the bead slurry.

19. The method of claim 17, further comprising calculating a minimum yield point to prevent the lightweight beads from floating or settling in the bead slurry, wherein the minimum yield point is based on a diameter of the lightweight beads and a density of the lightweight beads.

20. A method comprising:

calculating a shelf-life for a bead slurry, wherein the shelf-life is about 2 months or longer;

mixing a gelled base fluid and a plurality of lightweight beads at 300 rotations per minute to produce the bead slurry, wherein the bead slurry has an initial viscosity, wherein the gelled base fluid has a viscosity of about 10 cP to about 200 cP, wherein the plurality of lightweight beads has an average diameter of about 1 micron to about 20 microns;

wherein the gelled base fluid comprises water and a gelling agent of about 0.1% to about 5% by volume of the bead slurry, and wherein the shelf-life is the time it takes for the lightweight bead in the gelled base fluid to move 1 inch;

storing the bead slurry for about 2 months or longer, wherein the viscosity of the bead slurry is at least twice the initial viscosity for 2 months;

mixing the bead slurry and a cement slurry to yield a lightweight cement slurry;

introducing the lightweight cement slurry into a wellbore penetrating a subterranean formation; and allowing the lightweight cement slurry to set within a portion of the wellbore, a portion of the subterranean formation, or both;

wherein calculating the shelf-life comprises calculating a velocity of the lightweight beads in the bead slurry.

* * * * *